Figure 1:
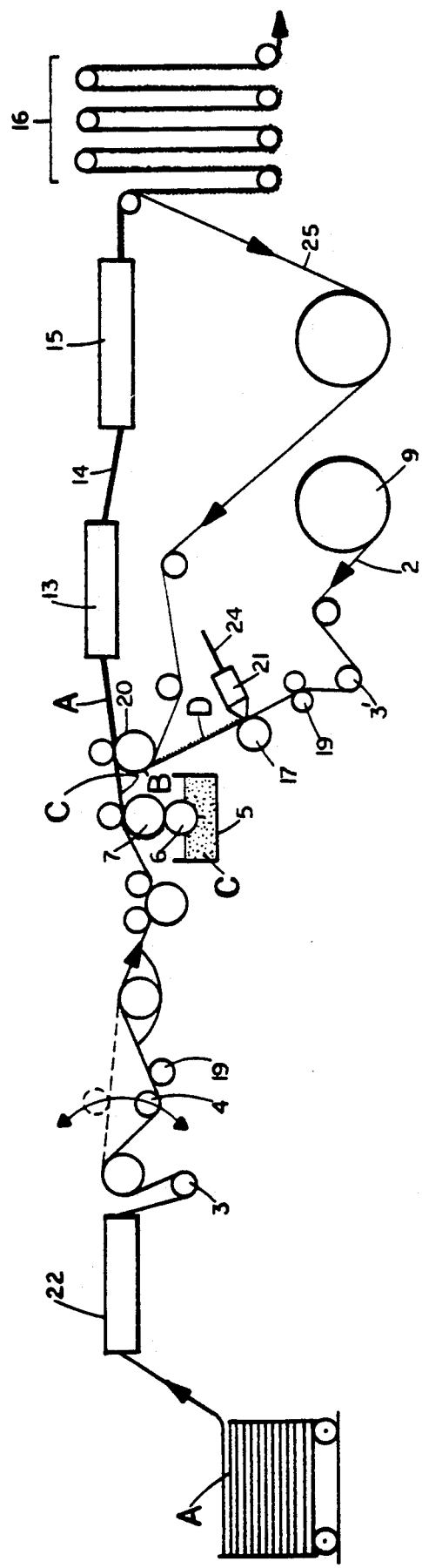

United States Patent [19]

Goss

[11] Patent Number: 5,004,638
[45] Date of Patent: Apr. 2, 1991

[54] FABRIC LAMINATION OF UNITARY BACKED HOT CONSTRUCTED CARPET TILE

[75] Inventor: Raymond W. Goss, Newark, Del.

[73] Assignee: Hercules Incorporated, Wilmington, Del.

[21] Appl. No.: 68,393

[22] Filed: Jul. 1, 1987

Related U.S. Application Data

[63] Continuation-in-part of Ser. No. 880,611, Jun. 30, 1986, abandoned.

[51] Int. Cl.[5] .................... D03D 27/00; D04H 11/00; D05C 17/00
[52] U.S. Cl. .......................... 428/95; 428/96; 428/44
[58] Field of Search .............. 428/44, 95, 96

[56] References Cited

U.S. PATENT DOCUMENTS

| | | | |
|---|---|---|---|
| 3,264,167 | 8/1966 | Sands | 161/111 |
| 3,728,182 | 4/1973 | Wisotzky et al. | 156/72 |
| 3,806,385 | 4/1974 | Terry | 156/72 |
| 4,522,857 | 6/1985 | Higgins | 428/95 |
| 4,576,665 | 3/1986 | Machell | 428/95 |
| 4,680,209 | 7/1987 | Zybko et al. | 428/95 X |

Primary Examiner—Alexander S. Thomas
Attorney, Agent, or Firm—John E. Crowe

[57] ABSTRACT

A warp resistant tile and method for preparation thereof in which a primary facing layer is secured to a tile backing layer which comprises a laminate having
(A) a characterizing layer of predetermined weight, bulk, and strength, this layer and being complementary to the primary facing, and to
(B) a thin flexible base layer.

10 Claims, 4 Drawing Sheets

FABRIC LAMINATION OF UNITARY BACKED HOT CONSTRUCTED CARPET TILE

This is a continuation-in-part of copending U.S. Ser. No. 880,611, filed on June 30, 1986 now abandoned, and relates to freestanding flexible carpet tile utilizing a unitary laminate backing, and its fabrication.

BACKGROUND

Carpet tile offers a number of economic advantages and conveniences over traditional "broad loom" carpeting. This is particularly true with regard to ease of repair or replacement of specific areas which are subject, for whatever reason, to heavy or uneven traffic patterns.

Carpet tiles, however, also have some recognized disadvantages in the form of substantial production and quality control problems. These are reflected in relatively high unit cost plus substantial variation in quality and durability.

For example, a relatively heavy extrusion backing and adhesive layer(s) arranged between the backing and primary carpet tile facing must supply most of the flexibility, weight and structural strength of conventional carpet tile. Not many conventional tile backing components, however, are capable of satisfying all of these needs. Furthermore, production and environment demands place a severe limitation on one's choice of possible facing/backing tile combinations, particularly with respect to environmentally-acceptable adhesives which can be successfully used to bind carpet facing and backing layers under high speed production conditions.

Moreover, high-speed commercial production usually requires a prestretching of primary facing and various backing layers to smooth out wrinkles and obtain an even surface for application of adhesive and eventual mating and cooling to form the uncut tile.

This, in turn, results in a number of problems since (a) very few, if any, primary carpet facings enjoy the same elastic properties as the tile base or the usual intermediate tile layers, and (b) few adhesive compositions, particularly environmentally acceptable adhesives, can be set up precisely enough to avoid or minimize inherent stress between the respective tile components and avoid damage to unset adhesive layers or warpage of the tile product. As a result, replacement or expensive post-lay down tile annealing treatment may become necessary.

As above noted, heavy extruded PVC tile bases of the usual type can provide adequate tile strength and weight, but at the expense of flexibility, to compensate for surface irregularities of a floor or corresponding surface. Such deficiency usually results in cracking and excess slippage of the applied tile.

It is an object of the present invention to develop a class of carpet tiles having widely varied primary facing/ backing combinations, which can be efficiently fabricated using conventional roll coating techniques under production conditions.

It is a further object to increase flexibility and durability of carpet tile.

It is a still further object of the present invention to promote efficient use of environmentally acceptable hot melt adhesives and sizing compositions for fabricating and various carpet tile facing and backing combinations under high speed production conditions.

THE INVENTION

It is possible to increase flexibility and durability of carpet tile having (a) a primary carpet facing component and (b) a tile backing component, inclusive of a tile base and at least one intermediate characterizing component arranged between the tile base and the facing component, by utilizing as tile base, a flexible layer substantially deficient in tile weight, strength and bulk; and incorporating, as intermediate characterizing component of the backing at least one adhesive/scrim layer combination, the intermediate component providing a substantial amount of at least tile weight and strength complementary to the primary facing component and the tile base, to obtain a desired carpet tile.

Of particular interest for present purposes is the use of an applied adhesive coating such as roll or spray-coated hot melt adhesive of the type discussed below as a tile base and the use of a scrim layer consisting essentially of at least one nonwoven material utilizing one or more web components and or fibrillated films combined with an adhesive layer.

Also included within the instant invention is a carpet tile comprising, in combination
- (A) a primary tile facing component; and
- (B) a tile backing component comprising
  - (1) an externally arranged thin flexible tile base;
  - (2) a characterizing component having at least one adhesive/scrim combination arranged intermediate the tile base and the primary facing component, and
  - (3) at least one adhesive or sizing layer arranged between the primary facing component and the characterizing component;

whereby the characterizing component, alone or in combination with the adhesive layer, provides at least one of weight and strength complementary to the primary facing component and the flexible tile base.

Figure 3:
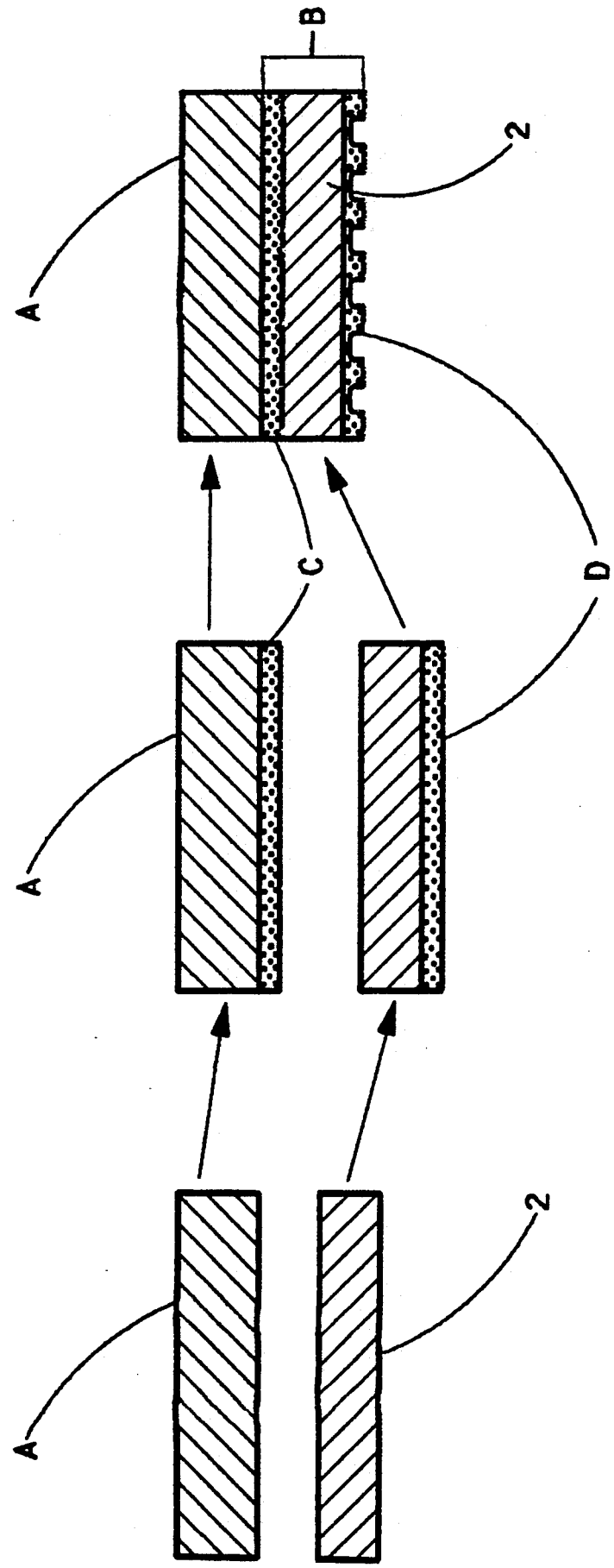
Figure 4:
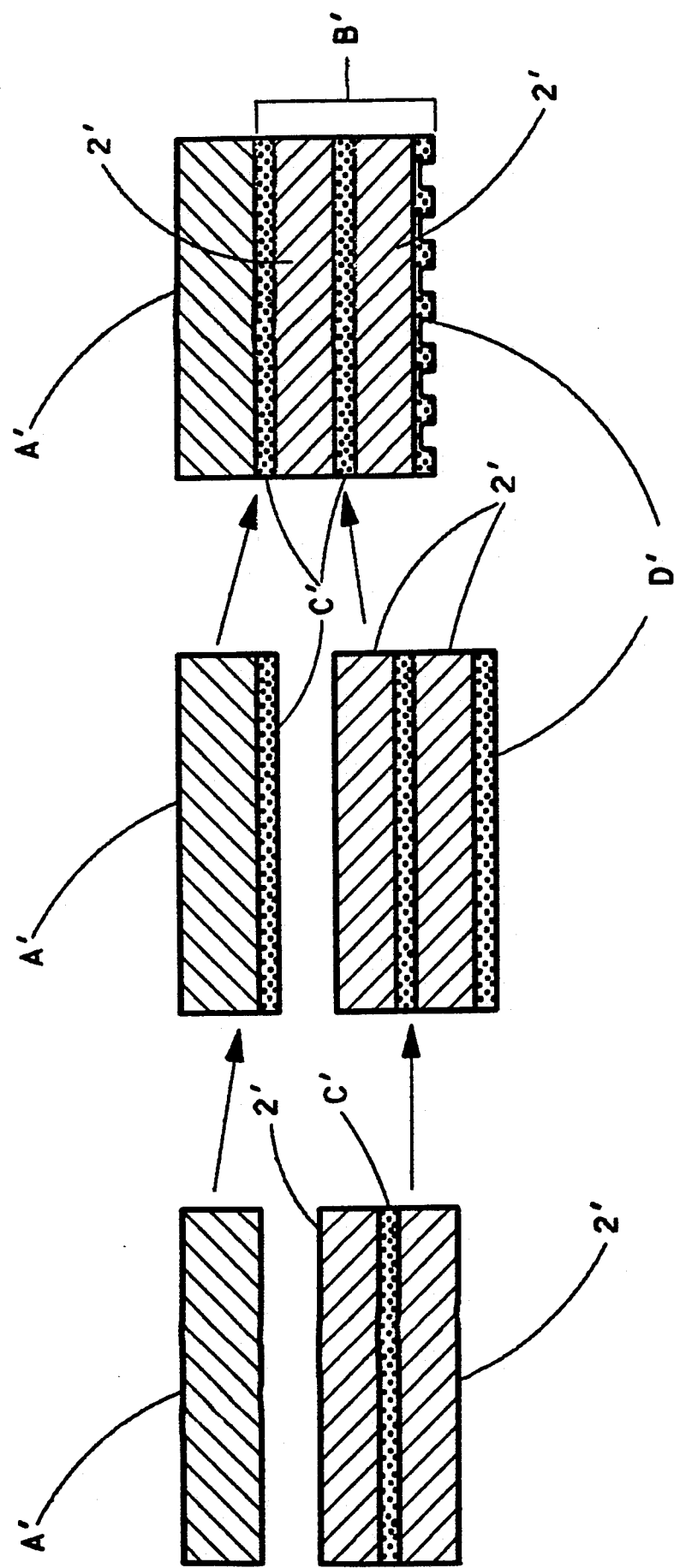

Production of tile within the scope of the present invention is further conveniently described by reference to FIGS. 3 and 4, below, showing schematic sections of representative components, in which the relative thickness of the tile components is not shown to scale. and in which (A) and (A') represent primary carpet facing components; 2 and 2' represent scrim layers, which, in combination with various adhesive layers (C) or (C') and embossed adhesive base layers (D) (D'), comprise tile backing layer (B) (B').

For present purposed the primary carpet facing (A) or (A') can more conveniently include a full range of art-recognized carpet facings such as woven or nonwoven varieties, comprising wool, nylon, polyester, polyolefin and similar fiber materials as well as fibrillated film. Included within such component are tufted and nontufted varieties.

Primary carpet facings of suitable type are listed, for instance, in U.S. Pat. Nos. 3,264,167, 3,806,385, 3,728,182, 4,439,475, and the like, including supplemental backing layers of natural or artificial type, as desired.

As earlier noted, primary facing components usually provide decoration, feel and at least some bulk, but relatively little tile weight (about 20–48 oz/yd$^2$) and virtually no cross-directional (CD) or other structural strength. This component is preferably precoated (not shown) with a latex or resin precoat composition applied in a conventional way by roll, spray or the like (reference U.S. Pat. No. 3,583,936) to hook or anchor tufts to the backing layers noted above.

Examples of suitable precoat material for primary facings include aliphatic or aromatic hydrocarbon resins such as Piccovar CB-48 (*1), carboxylated SBR (styrene-butadiene rubber) compositions (*2), and the like.

*1 obtained commercially from Hercules Inc.
*2 obtained commercially from Reichold Chemical Co.

Unitary laminate backing components (B) and (B'), for purposes of the present invention, preferably include an intermediate characterizing component comprised of one or more adhesive layers in a general (adhesive/scrim) configuration (Diagram I) or multiples thereof (Diagram II). For present purposes, laminate backing (B) or (B') can usefully vary in thickness from about 30–180 mil and conveniently weigh up to 120 oz/yd$^2$ or more. Such component usefully comprises (i) an applied flexible base layer (D) (D') of about 25-80 mil thickness and weighing about 40-100 oz/yd$^2$; such layer preferably consists of a hot melt adhesive layer applied conventionally or, alternatively, a combination of adhesive layers with a nonwoven or fibrillated polyolefin film layer; and (ii) an intermediate characterizing layer of one or more adhesive/scrim combinations identified as (C) (2) or as a multiple thereof (C') (2') varying in individual thickness from about 3-25 mil and weighing 2-20 oz/yd$^2$ or higher, the web orientation and binding of the scrim (2) (2') preferably being commensurate with a high CD strength in combination with at least one hot melt adhesive layer (C) (C') of about 20-300 mil or greater thickness.

For purposes of the present invention, the unitary laminate backing component (B)(B') can also be represented as (1) wholly or partly formed in situ (see above Diagrams), with adhesive base layer (D) (D') applied to one or more scrim layers (2) (2') wholly or partly set up before marriage with adhesive coated primary facing component (A) (A') or, (2) the tile backing (less base) is separately prepared and introduced as stored roll goods and the base coated and mated to an adhesive coated primary facing (A) (C).

Additional materials are also suitable for use as supplemental characterizing layers in combination with the scrim and adhesive layers. Such include, for instance, small incapsulated styrofoam balls, fines, and waste pieces of nylon sandwiched or incapsulated by, or placed between, the adhesive and nonwoven scrim layers.

Figure 2:
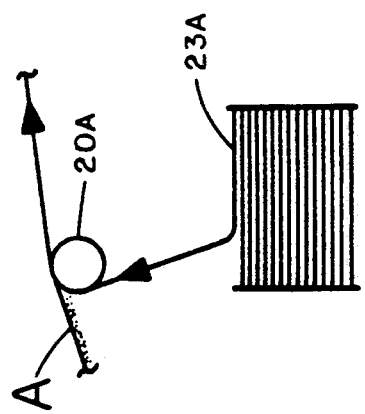

The arrangement of the above Diagrams is more fully demonstrated in a production line-context in attached FIGS. 1-2, in which.

FIG. 1 schematically represents to a production line which can be used for high speed production of tile, such as carpet tile, in accordance with the present invention. In this figure, primary facing component (A), such as a precoated and stored tufted or nontufted facing is fed through tentering frame (22) and a predetermined amount of tension applied to minimize wrinkles and surface irregularities by passing through tension and guide rolls (3) (4) (19) equipped with an appropriate by-pass roll arrangement (4). Primary facing component (A) is then passed through a primary adhesive applicator area comprising an adhesive well (5) containing adhesive (C) and contacting applicator rolls (6) (7), for application of adhesive onto the reverse side of facing component (A) at a point upstream of the locus of applied contact with a unitary laminate tile backing component (B), comprising a flexible adhesive base layer (D) applied to an earlier prepared layer of nonwoven scrim or a scrim/adhesive/ scrim laminate configuration fed from characterizing feed roll (9) or comparable box or bin (not shown) the base layer, (D) the characterizing layer (2) and the facing (A) are prestretched by use of tension rolls (3) (4) (3'). Base adhesive layer (D) is applied from slot die (21) feedably connected to an adhesive feed line (24). The source of the adhesive and heating means (where hot melt adhesive is used) are conventional and not shown here.

Continuous embossing belt (25) contacts the hot adhesive base/characterizing component combination at marriage roll (20), this roll having convenient temperature circumference, and speed of rotation to imprint the base and set up applied adhesive layers (B) and (C) prior to release of tension on the uncut tile.

If desired, roll (20) can also be replaced with multiple cooling rolls (not shown) to more closely control the functional situation demonstrated in the above Diagrams.

The combined primary facing component (A) and backing component (B) are then passed, in register, over cooling table (13), and the resulting uncut tile material (14) and continuous embossing belt (25) passed over tentering frame (15), separated, and the tile passed to accumulator (16) prior to cutting (not shown).

FIG. 2 demonstrates a modification of FIG. I, in which the entire preformed backing component (23A) is stored, and fed, as needed, over roll (20A) to obtain the uncut tile. Such arrangement, while somewhat more expensive than the process practiced in FIG. I, substantially limits the amount of internal shear force which is generated and must be absorbed by adhesive layers having extended base within a high speed tile production line.

For purposes of the present invention, a supplemental base layer (not shown) can be separately combined with base adhesive (D) in the form of one or more polyolefin films, a nonwoven fabric or similar roll goods, essentially exhibiting durability, flexibility, and tile adhesive-holding properties.

Such augmented base layer can conveniently vary in weight from about 40-80 oz/yd or less, provided the combined layer supplies sufficient flexibility to the tile. FIGS. 3 and 4, as earlier described, demonstrate schematic cross sectional representations of tile components of the present invention assembled at various points along the production line of FIGS 1 and 2, in which C, C$^1$ and D$^1$ represent an adhesive, preferably an environmentally sound not melt adhesive, the above-indicated set up or cooling problems being conveniently resolved by the substantial amount of lateral flexibility and shear resistance built into tile, and particularly by pre-annealing of tile components in accordance with FIG. 2.

As a matter of convenience, the above-defined adhesive layers may comprise identical or similar compositions, although the instant invention is not so limited.

Suitable art-recognized hot melt adhesives for present purposes include ethylene-vinylacetate copolymers, aliphatic and aromatic hydrocarbon resins(*3), and the like, which may be combined with art-recognized additives such as filler material.

*3 Obtainable commercially from Hercules Incorporated under the trademarks Piccovar® CB-20, Hercotoc® AD resin, Piccopole® resin, and Picco® 5000 and Picco® 6000 resins.

Dependence mainly upon the choice and amount of applied adhesive layers to provide the needed complementary properties, however, tends to defeat the purpose of the present invention by limiting the choice of available adhesives, and limiting the number of possible facing and backing combinations which are compatible under high speed production conditions.

The layer (2), as above noted, and in accordance with the present invention must possess the ability to compensate, at least in part, for vertical irregularities in floor or base surfaces covered by the tile and patterned by the base layer.

What I claim and desire to protect by Letters Patent is:

1. In a method for increasing flexibility and durability of carpet tile having
   (a) a primary carpet facing component; and
   (b) a tile backing component comprising a tile base and at least one intermediate characterizing component arranged between said tile base and said facing component;
the improvement comprising utilizing, as tile base, a flexible layer comprising an adhesive coating deficient in tile weight, strength and bulk; and
incorporating, as intermediate characterizing component of the tile backing component, at least one adhesive/scrim layer combination; said intermediate characterizing component providing a substantial amount of at least tile weight and strength complementary to said primary facing component and said tile base, to obtain desired carpet tile characteristics.

2. The method of claim 1 wherein the adhesive coating consists essentially of hot melt adhesive.

3. The method of claim 1 wherein the scrim layer of the characterizing component consists essentially of at least one nonwoven material.

4. A carpet tile comprising, in combination,
   (A) a primary tile facing component; and
   (B) a tile backing component comprising
      (1) an externally arranged flexible tile base comprising an adhesive layer;
      (2) a characterizing component having at least one adhesive/scrim combination arranged intermediate said tile base and said primary facing component; and
      (3) at least one adhesive or sizing layer arranged between said primary facing component and said characterizing component;
said characterizing component, alone or in combination with said adhesive layer, providing at least one of weight and strength complementary to said primary facing component and said flexible tile base to obtain the desired tile.

5. A carpet tile of claim 4 wherein the flexible tile base comprises a hot melt adhesive layer.

6. The carpet tile of claim 4, wherein said adhesive layer of the characterizing component consists essentially of hot melt adhesive and said primary facing component has a precoat.

7. The carpet tile of claim 4 wherein the scrim layer of said characterizing component comprises a nonwoven material.

8. The carpet tile of claim 4 wherein said characterizing component comprises a plurality of layers of a nonwoven material.

9. The carpet tile of claim 4 wherein the tile base has a thickness of about 25-80 mil.

10. The carpet tile of claim 4 wherein the characterizing component of the tile backing component comprises two or more adhesive/scrim combinations.

* * * * *

UNITED STATES PATENT AND TRADEMARK OFFICE
CERTIFICATE OF CORRECTION

PATENT NO. : 5,004,638

DATED : April 2, 1991

INVENTOR(S) : Raymond W. Goss

It is certified that error appears in the above-identified patent and that said Letters Patent is hereby corrected as shown below:

ON THE TITLE PAGE: and at the top of Column 1, the heading "FABRIC LAMINATION OF UNITARY BACKED HOT CONSTRUCTED CARPET TILE" should read --FABRIC LAMINATION OF UNITARY BACKED HOT MELT CONSTRUCTED CARPET TILE--.

Signed and Sealed this

Eighth Day of December, 1992

Attest:

DOUGLAS B. COMER

Attesting Officer

Acting Commissioner of Patents and Trademarks